United States Patent
Scacchi et al.

(10) Patent No.: US 10,410,528 B2
(45) Date of Patent: *Sep. 10, 2019

(54) METHOD AND SYSTEM FOR AIDING LANDING OF AN AIRCRAFT

(71) Applicant: Airbus Operations SAS, Toulouse (FR)

(72) Inventors: Pierre Scacchi, Toulouse (FR); Matthieu Mayolle, Tournefeuille (FR); Cécile Puissacq, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 149 days.

This patent is subject to a terminal disclaimer.

(21) Appl. No.: 15/357,222

(22) Filed: Nov. 21, 2016

(65) Prior Publication Data

US 2017/0162065 A1 Jun. 8, 2017

(30) Foreign Application Priority Data

Dec. 3, 2015 (FR) .................................... 15 61787

(51) Int. Cl.
*G08G 5/02* (2006.01)
*G05D 1/06* (2006.01)
*G08G 5/00* (2006.01)

(52) U.S. Cl.
CPC .......... *G08G 5/025* (2013.01); *G05D 1/0676* (2013.01); *G08G 5/0021* (2013.01)

(58) Field of Classification Search
None
See application file for complete search history.

(56) References Cited

U.S. PATENT DOCUMENTS

2004/0044446 A1   3/2004  Staggs
2007/0225876 A1*  9/2007  Caillaud ............. G08G 5/0013
                                                        701/16

(Continued)

FOREIGN PATENT DOCUMENTS

EP    2654029    10/2013
FR    2948468     1/2011

(Continued)

OTHER PUBLICATIONS

French Search Report, dated Jul. 20, 2016, priority document.

*Primary Examiner* — Thomas G Black
*Assistant Examiner* — Demetra R Smith-Stewart
(74) *Attorney, Agent, or Firm* — Greer, Burns & Crain, Ltd.

(57) ABSTRACT

A method for aiding the landing of an aircraft on a landing runway comprises the following steps implemented in an automatic manner by a processing unit: a) acquiring information relating to the landing runway; b) acquiring information relating to a current situation of the aircraft; c) determining, as a function of said information, at least one deviation between at least one parameter relating to a landing position of the aircraft on the landing runway and a reference relating to a central longitudinal axis of the landing runway; d) comparing this deviation with a predetermined threshold; and e) as a function of the result of the comparison carried out in step d), commanding, if appropriate, the signaling of an alert by means of a signaling system of the aircraft.

12 Claims, 3 Drawing Sheets

(56) References Cited

U.S. PATENT DOCUMENTS

| | | | |
|---|---|---|---|
| 2010/0070115 A1* | 3/2010 | Villaume | B64D 45/04 |
| | | | 701/18 |
| 2011/0022251 A1 | 1/2011 | Puig et al. | |
| 2013/0066489 A1* | 3/2013 | Hooks | G01S 19/15 |
| | | | 701/17 |
| 2013/0218374 A1 | 8/2013 | Lacko et al. | |
| 2014/0114506 A1 | 4/2014 | Puyou et al. | |
| 2015/0198954 A1 | 4/2015 | Riedinger et al. | |
| 2015/0307207 A1* | 10/2015 | Meunier | G08G 5/02 |
| | | | 701/4 |
| 2017/0158349 A1* | 6/2017 | Scacchi | B64D 43/00 |
| 2017/0162066 A1* | 6/2017 | Scacchi | G08G 5/025 |
| 2018/0203466 A1* | 7/2018 | Chiodini | B64D 45/04 |

FOREIGN PATENT DOCUMENTS

| | | |
|---|---|---|
| FR | 2997066 | 4/2014 |
| FR | 3013882 | 5/2015 |
| FR | 3016449 | 7/2015 |

\* cited by examiner

METHOD AND SYSTEM FOR AIDING LANDING OF AN AIRCRAFT

CROSS-REFERENCES TO RELATED APPLICATIONS

This application claims the benefit of the French patent application No. 1561787 filed on Dec. 3, 2015, the entire disclosures of which are incorporated herein by way of reference.

BACKGROUND OF THE INVENTION

The invention relates to a method and to a system for aiding landing of an aircraft on a landing runway, as well as to an aircraft comprising such a system.

During an approach phase before a landing, an aircraft is generally obliged to follow an approach axis of a landing runway, up to a landing position of the aircraft on the landing runway, for which the wheels of the aircraft touch the landing runway (so-called "touchdown" position). This approach axis can, for example, correspond to an axis of an instrument-based approach of ILS ("Instrument Landing System") type Immediately after landing, the aircraft performs a rollout on the landing runway according to a substantially rectilinear trajectory close to a central longitudinal axis of the landing runway.

FIG. 1 illustrates, viewed from above, an exemplary approach to a landing runway 5 by an aircraft 1. FIG. 2 corresponds to a more detailed view around the landing position of the aircraft on the landing runway. This approach is also illustrated, in a side view, by FIG. 3. In manual piloting mode, during the approach phase, the pilot must pilot the aircraft 1 along the closest possible trajectory 12 to the approach axis 10 in such a way that, on the one hand, the landing position Td of the aircraft on the landing runway is as close as possible to the central longitudinal axis 4 of the landing runway (so as to avoid putting the aircraft down alongside the landing runway) and that, on the other hand, the speed vector Vtd of the aircraft at this landing position is substantially parallel to the central longitudinal axis of the landing runway (so as to avoid exiting the runway, laterally, during rollout after landing). If a risk of exiting the runway laterally exists, the pilot must perform a go-around and carry out a new approach. During the approach to the landing runway, in particular during the final phase of the approach, the pilot must therefore monitor the trajectory of the aircraft so as to be able to detect such a risk. Document FR2948468 A1 describes a method and a device for aiding the lateral control of an aircraft during the approach phase, making it possible to signal a caution in the cockpit of the aircraft in case a risk of lateral exit from the landing runway is predicted. It would however be beneficial to have alternatives to this method and to this device.

SUMMARY OF THE INVENTION

The present invention relates to a method for aiding the landing of an aircraft on a landing runway, the aircraft comprising a set of information sources, a flight management system, a processing unit and a signaling system. The method is noteworthy in that it comprises the following steps implemented in an automatic manner by the processing unit:
a) acquiring, from the flight management system, information relating to the landing runway;
b) acquiring, from the set of information sources, information relating to a current situation of the aircraft;
c) determining, as a function, on the one hand, of the information relating to the current situation of the aircraft and, on the other hand, of the information relating to the landing runway, at least one deviation between, on the one hand, at least one parameter relating to a landing position of the aircraft on the landing runway and, on the other hand, a reference relating to a central longitudinal axis of the landing runway;
d) comparing this deviation with a predetermined threshold; and
e) as a function of the result of the comparison carried out in step d), commanding, if appropriate, the signaling of an alert by means of the signaling system of the aircraft.

Thus, by virtue of the signaling of an alert in the cockpit of the aircraft, this method makes it possible to forewarn a crew member, in particular a pilot of the aircraft, of a risk of lateral exit from the runway. It thus makes it possible to improve safety since the pilot can then act accordingly to avoid this risk of runway exit, by correcting the trajectory of the aircraft if this is possible without additional risk or by carrying out a go-around so as to attempt a new approach.

In a first variant:
in step c), the at least one parameter corresponds to the landing position of the aircraft on the landing runway and the at least one deviation corresponds to a deviation between, on the one hand, the landing position of the aircraft on the landing runway and, on the other hand, the central longitudinal axis of the landing runway;
in step d), this deviation is compared with a predetermined distance threshold; and
in step e), the processing unit commands the signaling of the alert if this deviation is greater, in absolute value, than this predetermined distance threshold.

In a second variant:
in step b), the information relating to the current situation of the aircraft comprises a current roll angle of the aircraft;
in step c), the at least one parameter corresponds to the landing position of the aircraft on the landing runway and the at least one deviation corresponds to a deviation between, on the one hand, the landing position of the aircraft on the landing runway and, on the other hand, the central longitudinal axis of the landing runway;
in step d), this deviation is compared with a predetermined distance threshold and the current roll angle is compared with a predetermined roll angle threshold; and
in step e), the processing unit commands the signaling of the alert if the following conditions all hold:
the deviation is greater, in absolute value, than this predetermined distance threshold;
the current roll angle is greater, in absolute value, than the predetermined roll angle threshold; and
the current roll angle tends to deviate the landing position of the aircraft on the landing runway from the central longitudinal axis of the landing runway.

In a third variant:
in step c), the at least one parameter corresponds to a speed vector of the aircraft at its landing position on the landing runway and the at least one deviation corresponds to an angular deviation between, on the one hand, this speed vector and, on the other hand, a direction of the central longitudinal axis of the landing runway;

in step d), this deviation is compared with a predetermined angular threshold; and in step e), the processing unit commands the signaling of the alert if this deviation is greater, in absolute value, than this predetermined angular threshold.

In a particular embodiment, steps a), b), c), d) and e) are implemented in an automatic and repetitive manner as long as a current height of the aircraft is greater than a predetermined height threshold, the method furthermore comprising the following steps implemented in an automatic manner by the processing unit when the current height of the aircraft is less than this predetermined height threshold:

a) acquiring, from the flight management system, information relating to the landing runway;

b) acquiring, from the set of information sources, information relating to a current situation of the aircraft;

f) determining a maximum roll angle, in absolute value, necessary to allow a flight of the aircraft along a trajectory between a current position of the aircraft and a target landing position of the aircraft on the landing runway;

g) comparing this maximum roll angle with a predetermined roll angle limit; and h) as a function of the result of the comparison carried out in step g), commanding, if appropriate, the signaling of an alert by means of the signaling system of the aircraft.

In another particular embodiment, steps a), b), c), d) and e) are implemented in an automatic and repetitive manner as long as a current height of the aircraft is greater than a predetermined height threshold, the method furthermore comprising the following steps implemented in an automatic manner by the processing unit when the current height of the aircraft is less than this predetermined height threshold:

a) acquiring, from the flight management system, information relating to the landing runway;

b) acquiring, from the set of information sources, information relating to a current situation of the aircraft;

i) determining, as a function, on the one hand, of the information relating to the current situation of the aircraft and, on the other hand, of the information relating to the landing runway, a landing position of the aircraft on a central longitudinal axis of the landing runway, this landing position being determined as a function of a trajectory determined between a current position of the aircraft and this landing position so as to comply with at least one constraint relating to a roll angle of the aircraft;

j) determining a parameter relating to the landing position of the aircraft on the central longitudinal axis of the landing runway;

k) determining a deviation between this parameter and a reference value;

l) comparing this deviation with a predetermined threshold; and m) as a function of the result of the comparison carried out in step l), commanding, if appropriate, the signaling of an alert by means of the signaling system of the aircraft.

The invention also relates to a system for aiding landing of an aircraft on a landing runway, the aircraft comprising a set of information sources, a flight management system and a signaling system. The system for aiding landing is noteworthy in that it comprises a processing unit configured to implement the following steps:

a) acquiring, from the flight management system, information relating to the landing runway;

b) acquiring, from the set of information sources, information relating to a current situation of the aircraft;

c) determining, as a function, on the one hand, of the information relating to the current situation of the aircraft and, on the other hand, of the information relating to the landing runway, at least one deviation between, on the one hand, at least one parameter relating to a landing position of the aircraft on the landing runway and, on the other hand, a reference relating to a central longitudinal axis of the landing runway;

d) comparing this deviation with a predetermined threshold; and e) as a function of the result of the comparison carried out in step d), commanding, if appropriate, the signaling of an alert by means of the signaling system of the aircraft.

In a first variant, the processing unit is configured in such a way that:

in step c), the at least one parameter corresponds to the landing position of the aircraft on the landing runway and the at least one deviation corresponds to a deviation between, on the one hand, the landing position of the aircraft on the landing runway and, on the other hand, the central longitudinal axis of the landing runway;

in step d), this deviation is compared with a predetermined distance threshold; and in step e), the processing unit commands the signaling of the alert if this deviation is greater, in absolute value, than this predetermined distance threshold.

In a second variant, the processing unit is configured in such a way that:

in step b), the information relating to the current situation of the aircraft comprises a current roll angle of the aircraft;

in step c), the at least one parameter corresponds to the landing position of the aircraft on the landing runway and the at least one deviation corresponds to a deviation between, on the one hand, the landing position of the aircraft on the landing runway and, on the other hand, the central longitudinal axis of the landing runway;

in step d), this deviation is compared with a predetermined distance threshold and the current roll angle is compared with a predetermined roll angle threshold; and in step e), the processing unit commands the signaling of the alert if the following conditions all hold:

the deviation is greater, in absolute value, than this predetermined distance threshold;

the current roll angle is greater, in absolute value, than the predetermined roll angle threshold; and the current roll angle tends to deviate the landing position of the aircraft on the landing runway from the central longitudinal axis of the landing runway.

In a third variant, the processing unit is configured in such a way that:

in step c), the at least one parameter corresponds to a speed vector of the aircraft at its landing position on the landing runway and the at least one deviation corresponds to an angular deviation between, on the one hand, this speed vector and, on the other hand, a direction of the central longitudinal axis of the landing runway;

in step d), this deviation is compared with a predetermined angular threshold; and in step e), the processing unit commands the signaling of the alert if this deviation is greater, in absolute value, than this predetermined angular threshold.

In a particular embodiment, the processing unit is configured so as to:
implement steps a), b), c), d) and e) in an automatic and repetitive manner as long as a current height of the aircraft is greater than a predetermined height threshold; and
implement the following steps in an automatic manner when the current height of the aircraft is less than this predetermined height threshold:
a) acquiring, from the flight management system, information relating to the landing runway;
b) acquiring, from the set of information sources, information relating to a current situation of the aircraft;
f) determining a maximum roll angle, in absolute value, necessary to allow a flight of the aircraft along a trajectory between a current position of the aircraft and a target landing position of the aircraft on the landing runway;
g) comparing this maximum roll angle with a predetermined roll angle limit; and
h) as a function of the result of the comparison carried out in step g), commanding, if appropriate, the signaling of an alert by means of the signaling system of the aircraft.

In another particular embodiment, the processing unit is configured so as to:
implement steps a), b), c), d) and e) in an automatic and repetitive manner as long as a current height of the aircraft is greater than a predetermined height threshold; and
implement the following steps in an automatic manner when the current height of the aircraft is less than this predetermined height threshold:
a) acquiring, from the flight management system, information relating to the landing runway;
b) acquiring, from the set of information sources, information relating to a current situation of the aircraft;
i) determining, as a function, on the one hand, of the information relating to the current situation of the aircraft and, on the other hand, of the information relating to the landing runway, a landing position of the aircraft on a central longitudinal axis of the landing runway, this landing position being determined as a function of a trajectory determined between a current position of the aircraft and this landing position so as to comply with at least one constraint relating to a roll angle of the aircraft;
j) determining a parameter relating to the landing position of the aircraft on the central longitudinal axis of the landing runway;
k) determining a deviation between this parameter and a reference value;
l) comparing this deviation with a predetermined threshold; and
m) as a function of the result of the comparison carried out in step l), commanding, if appropriate, the signaling of an alert by means of the signaling system of the aircraft.

The invention also relates to an aircraft comprising a system for aiding landing such as aforementioned.

BRIEF DESCRIPTION OF THE DRAWINGS

The invention will be better understood on reading the description which follows and on examining the appended figures.

DETAILED DESCRIPTION OF THE PREFERRED EMBODIMENTS

Figure 4:
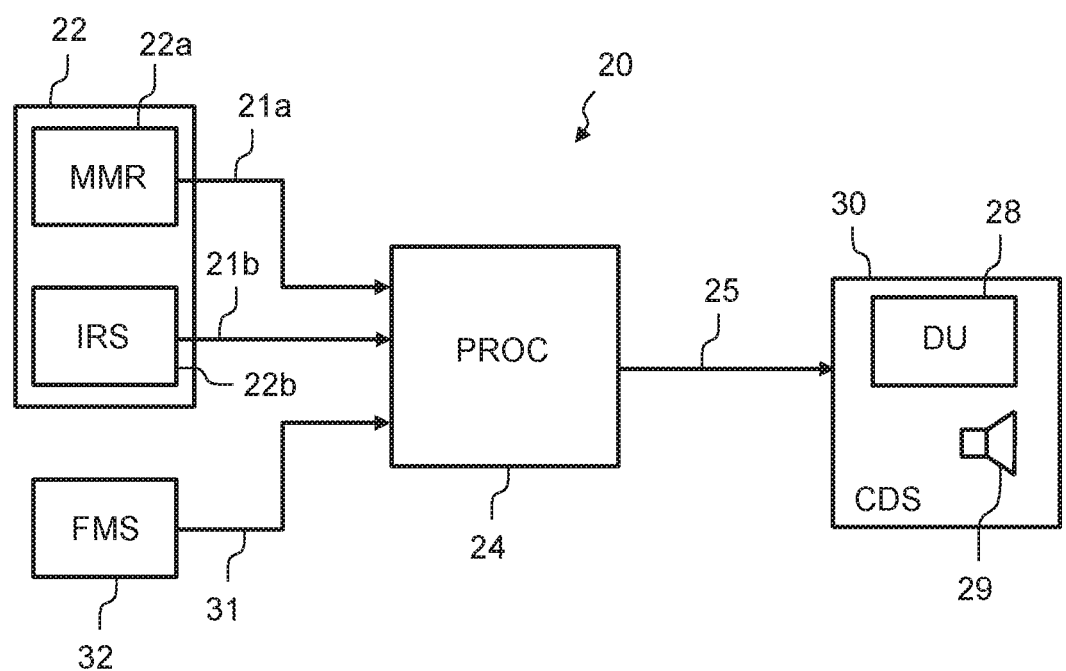
FIG. 4 illustrates a system for aiding landing in accordance with an embodiment of the invention.

The aircraft 1 comprises a system for aiding landing 20 such as represented in FIG. 4. The system 20 comprises a processing unit 24 (labeled "PROC" in the figure). This processing unit can in particular form part of a computer of flight commands of the aircraft, for example a guidance computer of FG ("Flight Guidance") type, a control computer of FCS ("Flight Control System") type, etc. The processing unit 24 is connected at input to a set of information sources 22 of the aircraft, comprising, for example, a monitoring unit 22a, in particular of MMR ("Multi Mode Receiver") type, and an inertial platform 22b of IRS ("Inertial Reference System") type. The processing unit 24 is connected to the monitoring unit 22a by a link 21a and to the inertial platform 22b by a link 21b. The processing unit 24 is also connected at input to a flight management system 32 of the aircraft, for example a computer of FMS ("Flight Management System") type, by a link 31. The processing unit 24 is connected at output, by a link 25, to a signaling system 30 of the aircraft, for example a system of CDS ("Control and Display System") type comprising a display unit 28 (labeled DU in the figure for "Display Unit") and/or a sound signaling device in the cockpit, such as a loudspeaker 29.

During operation, in a first embodiment, the processing unit 24 acquires, from the flight management system, information relating to the landing runway. It also acquires, from the set of information sources 22, information relating to a current situation of the aircraft. This information relating to the current situation of the aircraft corresponds to at least one subset of the following information: the position, the speed, the acceleration and the orientation (angle of roll, angle of attitude, angle of sideslip, etc.) of the aircraft. As a function of the information relating to the current situation of the aircraft and of the information relating to the landing runway, the processing unit 24 determines at least one deviation between, on the one hand, at least one parameter relating to a landing position of the aircraft on the landing runway and, on the other hand, a reference relating to a central longitudinal axis of the landing runway. The processing unit 24 compares this deviation with a predetermined threshold and, as a function of the result of the comparison of this deviation with this predetermined threshold, it commands, if appropriate, the signaling of an alert by means of the signaling system 30 of the aircraft.

Figure 1:
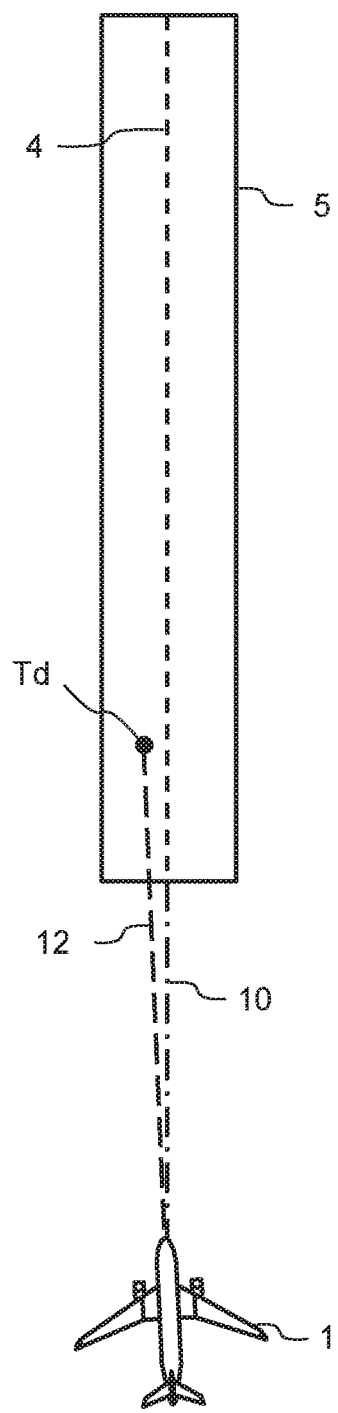
FIGS. 1 and 2, already described, illustrate viewed from above an exemplary approach to a landing runway by an aircraft.
Figure 2:
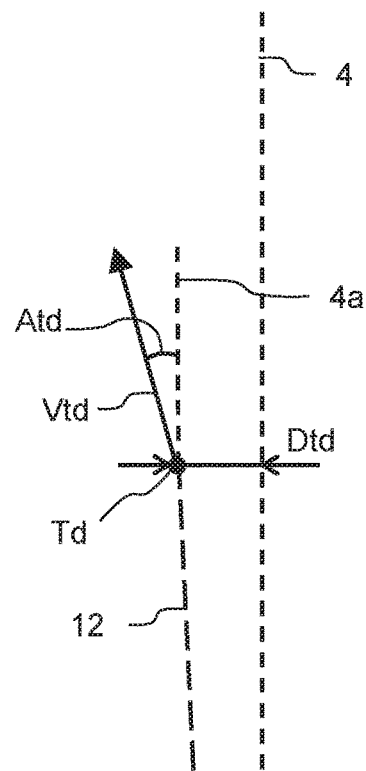

More precisely, in a first variant of the first embodiment, the at least one parameter corresponds to the landing position Td of the aircraft on the landing runway and the at least one deviation corresponds to a deviation Dtd between, on the one hand, the landing position Td of the aircraft on the landing runway and, on the other hand, the central longitudinal axis 4 of the landing runway 5, as represented in FIG. 2. The processing unit 24 compares this deviation Dtd with a predetermined distance threshold and it commands the signaling of the alert if this deviation is greater, in absolute value, than the predetermined distance threshold. The predetermined distance threshold can be chosen as a function of the width of the landing runway and of characteristics of the aircraft, in particular its dimensions and the positions of the various landing gear. This predetermined distance threshold can, for example, be chosen in an interval of 7 meters to 15 meters. The value of the predetermined distance threshold can be refined experimentally so as to obtain robust detection of the cases justifying an alert, without producing too many false alerts. To command the signaling of the alert, the processing unit 24 dispatches a signal, through the link 25, to the signaling system 30 which then triggers a display of the alert on the display unit 28 and/or a sound signal in the cockpit by means of the loudspeaker 29. The deviation Dtd can, for example, be computed using the following equation:

$$Dtd = D + V_y \cdot Ttd + 0.5 \cdot A_y \cdot Ttd^2$$

in which:

D is a current deviation, in projection in a horizontal plane, between a current position of the aircraft and a straight line passing through the central longitudinal axis 4 of the landing runway. Several procedures are possible for determining the deviation D:

according to a first procedure, the current position of the aircraft is measured by at least one of the information sources 22, for example by a GPS ("Global Positioning System") receiver of the unit MMR 22a or by the inertial platform 22b. The current position can also correspond to a hybridization of the measurements carried out by the GPS receiver and by the inertial platform. The position of the central longitudinal axis 4 of the landing runway forms part of the information relating to the landing runway acquired from the flight management system 32 by the processing unit 24. As a function of the current position of the aircraft and of the position of the central longitudinal axis 4 of the landing runway, the processing unit 24 computes the deviation D such as defined above;

according to a second procedure, the set of information sources 22 comprises a receiver of ILS ("Instrument Landing System") type. Thus, in the case of an instrument-based approach of ILS type, this receiver receives signals corresponding in particular to a beam LOC emitted by an emitter situated on the ground. On the basis of the signals, the receiver of ILS type (or the processing unit 24) can estimate, in a known manner, the deviation between the current position of the aircraft and the approach axis 10. This deviation corresponds to the deviation D;

according to a third procedure, the set of information sources 22 comprises a camera embedded aboard the aircraft and positioned so as to film ahead of the aircraft. This camera therefore makes it possible to film a zone comprising the landing runway. A system for analyzing images is coupled to this camera: it makes it possible to identify the central longitudinal axis of the landing runway by using known techniques, for example a Hough transform. A current height Hgnd of the aircraft relative to a threshold of the landing runway also being known aboard the aircraft (by virtue of the set of information sources 22), the processing unit 24 can determine a deviation between the current position of the aircraft and the central longitudinal axis of the landing runway, therefore the deviation D;

These various procedures may optionally be combined to consolidate the estimation of the deviation D;

Vy is a current lateral speed of the aircraft relative to the ground. It corresponds to the projection of the current speed of the aircraft relative to the ground, on a horizontal axis perpendicular to the central longitudinal axis 4 of the landing runway;

Ay is a current lateral acceleration of the aircraft relative to the ground. According to a first procedure, it can be obtained by projecting the current acceleration of the aircraft relative to the ground, on the horizontal axis perpendicular to the central longitudinal axis 4 of the landing runway. According to a second procedure, it can be estimated using, for example, the following equation:

$$A_y = g \cdot \tan \varphi \cdot \cos \theta$$

in which:

g is the acceleration due to gravity;

$\varphi$ is the current roll angle of the aircraft; and $\theta$ is the current pitch angle of the aircraft.

The values of the angles $\varphi$ and $\theta$ are provided, in a usual manner, by the inertial platform 22b; and Ttd is a time interval between a current instant and an estimated instant of touchdown of the wheels of the aircraft on the landing runway, at the landing position Td. The time interval Ttd can in particular be estimated using the following equation:

$$Ttd = \frac{H_{gnd}}{-VS_{gnd}} + T_{flare}$$

in which:

Hgnd is a current height of the aircraft relative to a threshold of the landing runway, known aboard the aircraft by virtue of the set of information sources 22;

VSgnd is a current vertical speed of the aircraft relative to the ground. It is provided by the set of information sources 22, in particular by a GPS receiver of the unit MMR 22a or by the inertial platform 22b (or else by hybridization of values provided by the GPS receiver and by the inertial platform). In the equation, this speed is defined positive upwards.

Tflare is an optional corrective term making it possible to take account of the additional time taken by the aircraft to carry out a flare maneuver on landing. When this term is used, its value can be fixed (for example 5 seconds) or else result from estimations dependent on the aircraft, its current flight conditions (mass, aerodynamic configuration, etc.).

In a second variant of the first embodiment, the information relating to the current situation of the aircraft comprises a current roll angle $\varphi$ of the aircraft. As in the first variant, the at least one parameter corresponds to the landing position Td of the aircraft on the landing runway and the at least one deviation corresponds to a deviation Dtd between, on the one hand, the landing position Td of the aircraft on the landing runway and, on the other hand, the central longitudinal axis 4 of the landing runway 5. The processing unit 24 compares this deviation Dtd with a predetermined distance threshold, as in the first variant. Furthermore, the processing unit 24 compares the current roll angle $\varphi$ with a predetermined roll angle threshold. This predetermined roll angle threshold can, for example, be chosen in an interval lying between 3 degrees and 5 degrees. The value of the predetermined roll angle threshold can be refined experimentally so as to obtain robust detection of the cases justifying an alert, without producing too many false alerts. The processing unit 24 commands the signaling of the alert if the following conditions all hold:

the deviation Dtd is greater, in absolute value, than the predetermined distance threshold;

the current roll angle $\varphi$ is greater, in absolute value, than the predetermined roll angle threshold; and the current roll angle tends to deviate the landing position Td of the aircraft on the landing runway from the central longitudinal axis 4 of the landing runway.

In an advantageous manner, the third condition hereinabove corresponds to the following logic equation:

$$((Dtd>0) \text{AND} (\varphi<0)) \text{OR} ((Dtd<0) \text{AND} (\varphi>0))$$

with:

Dtd>0 when Td is situated to the left of the central longitudinal axis of the landing runway (seen from the aircraft) and Dtd<0 when Td is situated to the right of the axis;

$\varphi>0$ when the aircraft banks to the right (that is to say when the right wing of the aircraft is lower than the left wing) and $\varphi<0$ when the aircraft banks to the left;

AND corresponds to the logical AND operator; and

OR corresponds to the logical OR operator.

In a third variant of the first embodiment, the at least one parameter corresponds to a speed vector Vtd of the aircraft at its landing position Td on the landing runway and the at least one deviation corresponds to an angular deviation Atd between, on the one hand, this speed vector Vtd and, on the other hand, a direction 4a of the central longitudinal axis 4 of the landing runway. As represented in FIG. 2, the direction 4a corresponds to a straight line parallel to the axis 4 and passing through the landing position Td. The processing unit 24 compares this angular deviation Atd with a predetermined angular threshold and it commands the signaling of the alert if this deviation is greater, in absolute value, than this predetermined angular threshold. The value of the predetermined angular threshold can be chosen to be included in an interval between 5 degrees and 15 degrees, for example equal to about 10 degrees. This value can be refined experimentally so as to obtain robust detection of the cases justifying an alert, without producing too many false alerts. In an advantageous manner, the processing unit 24 determines the angular deviation Atd by means of the following equation:

$$Atd = Track_{td} - \psi_{track}$$

in which:

$\psi$track is the direction (expressed in degrees) of the central longitudinal axis of the landing runway relative to North;

Tracktd is the estimated direction, relative to North, of the speed vector Vtd of the aircraft at the landing position Td. This direction can be estimated by means of the following equation:

$$Track_{td} = \left[ Track + \frac{Ttd \cdot g \cdot \tan\varphi}{V_{gnd}} \cdot \frac{180}{\pi} \right]_{360}$$

in which:

Track is the direction, relative to North, of the current ground speed vector of the aircraft;

Ttd is the aforementioned time interval between the current instant and an estimated instant of touchdown of the wheels of the aircraft on the landing runway, at the landing position Td;

g is the acceleration due to gravity;

$\varphi$ is the current roll angle of the aircraft;

Vgnd is the current ground speed of the aircraft; and $[\ ]_{360}$ symbolizes the operator modulo 360 degrees.

The third variant of the first embodiment can be combined with one or the other of the first or second variants. According to a first alternative, this combination can be carried out by means of a logical OR of the conditions of activation of the alerts corresponding to the combined variants, thereby allowing greater sensitivity in the detection of cases of alert. According to a second alternative, this combination can be carried out by means of a logical AND of the conditions of activation of the alerts corresponding to the combined variants, thereby allowing greater immunity to false alerts.

In a second embodiment, the processing unit 24 acquires, from the flight management system 32, information relating to the landing runway. It also acquires, from the set of information sources 22, information relating to a current situation of the aircraft. This information relating to the current situation of the aircraft corresponds to at least one subset of the following information: the position, the speed, the acceleration and the orientation (angle of roll, angle of attitude, etc.) of the aircraft. The processing unit 24 determines a maximum roll angle, in absolute value, necessary to allow a flight of the aircraft along a trajectory between a current position of the aircraft and a target landing position of the aircraft on the landing runway. The processing unit 24 compares this maximum roll angle with a predetermined roll angle limit and, as a function of the result of the comparison of the maximum roll angle with the predetermined roll angle limit, it commands, if appropriate, the signaling of an alert by means of the signaling system 30 of the aircraft.

In an advantageous manner, the target landing position of the aircraft on the landing runway is situated on the central longitudinal axis 4 of the landing runway. This makes it possible to avoid a lateral deviation of the landing position of the aircraft on the landing runway, with respect to the central longitudinal axis.

The processing unit 24 determines a trajectory able to be controlled by a pilot of the aircraft so as to rejoin the target landing position from the current position of the aircraft. The maximum roll angle corresponds to the largest roll angle (in absolute value) necessary for a flight of the aircraft 1 along the trajectory.

The predetermined roll angle limit is chosen so as to correspond to a maximum roll angle that a pilot of the aircraft can control at the current height of the aircraft relative to the ground, without taking any risk of collision of a part of the aircraft (in particular a wing tip) with the terrain. This limit can correspond to a fixed value or else depend on other parameters, such as, for example, the height of the aircraft relative to the terrain or to the threshold of the landing runway, or else the current ground speed of the aircraft. For example, for a height of the aircraft relative to the threshold of the landing runway of less than 100 feet (about 30 meters), the predetermined roll angle limit can be chosen substantially equal to 3 degrees.

When the result of the comparison of the maximum roll angle with the predetermined roll angle limit is such that the maximum roll angle is greater, in absolute value, than the predetermined roll angle limit, the processing unit 24 dispatches a signal, through the link 25, to the signaling system 30 which then triggers a display of the alert on the display unit 28 and/or a sound signal in the cockpit by means of the loudspeaker 29.

In a still advantageous manner, the processing unit 24 computes the maximum roll angle $\varphi$ Tmax by means of the following equation:

$$\varphi T\max = \text{Arctan}\left( \frac{-(D + V_y \cdot T_{td})}{0.5 \cdot T_{td}^2 \cdot g \cdot \cos\theta} \right)$$

in which the parameters D, Vy, Ttd, g and θ are such as defined with reference to the first embodiment.

This value of the maximum roll angle corresponds to a case in which the trajectory between the current position of the aircraft and the target landing position is such that it makes it possible to cancel the lateral deviation D after a time Ttd with respect to the current instant, therefore when landing at the target landing position. This trajectory is substantially parabolic between the current position of the aircraft and the target landing position and the roll angle necessary to fly this trajectory is substantially constant and equal to φTmax along the trajectory.

In a third embodiment, the processing unit 24 acquires, from the flight management system 32, information relating to the landing runway. It also acquires, from the set of information sources 22, information relating to a current situation of the aircraft. This information relating to the current situation of the aircraft corresponds to at least one subset of the following information: the position, the speed, the acceleration and the orientation (angle of roll, angle of attitude, etc.) of the aircraft. As a function of the information relating to the current situation of the aircraft and of the information relating to the landing runway, the processing unit 24 determines a landing position of the aircraft on the central longitudinal axis 4 of the landing runway, this landing position being determined as a function of a trajectory determined between a current position of the aircraft and this landing position so as to comply with at least one constraint relating to a roll angle of the aircraft. The processing unit 24 thereafter determines a parameter relating to the landing position of the aircraft on the central longitudinal axis of the landing runway as well as a deviation between this parameter and a reference value. The processing unit 24 compares this deviation with a predetermined threshold, and then, as a function of the result of the comparison carried out between this deviation and this predetermined threshold, it commands, if appropriate, the signaling of an alert by means of the signaling system 30 of the aircraft.

In an advantageous manner, the constraint relating to the roll angle of the aircraft comprises:
 a first condition according to which the roll angle must be less than or equal (in absolute value) to a maximum value of roll angle during a flight of the aircraft along the trajectory; and/or
 a second condition according to which the derivative with respect to time of the roll angle must be less than or equal (in absolute value) to a maximum value of roll rate during a flight of the aircraft along the trajectory.

For the first condition, the maximum value of roll angle is chosen so as to correspond to a roll angle that a pilot of the aircraft can control at the current height of the aircraft relative to the ground, without taking any risk of collision of a part of the aircraft (in particular a wing tip) with the terrain. This maximum value can correspond to a fixed value or else depend on other parameters, such as, for example, the height of the aircraft relative to the terrain or to the threshold of the landing runway, or else the current ground speed of the aircraft. This value can, for example, be chosen substantially equal to 3 degrees when the height of the aircraft relative to the threshold of the landing runway is less than 100 feet (about 30 meters). For the second condition, the maximum value of roll rate is chosen so as to correspond to a roll rate that a pilot of the aircraft can control at the current height of the aircraft relative to the ground, without taking any risk of collision of a part of the aircraft (in particular a wing tip) with the terrain and/or without fearing to take such a risk. This maximum value can correspond to a fixed value or else depend on other parameters, such as, for example, the height of the aircraft relative to the terrain or to the threshold of the landing runway, or else the current ground speed of the aircraft. This value can, for example, be chosen substantially equal to 2 degrees per second when the height of the aircraft relative to the threshold of the landing runway is less than 100 feet (about 30 meters).

According to one possibility, the parameter relating to the landing position of the aircraft on the central longitudinal axis of the landing runway corresponds to a distance between the current position of the aircraft and the landing position, this distance being considered in projection on a straight line parallel to the central longitudinal axis of the landing runway. In a particular manner, the reference value corresponds to a current landing distance determined as a function of the information relating to the current situation of the aircraft. The term current landing distance designates here a landing distance estimated at the current instant as a function of the information relating to the current situation of the aircraft. This current landing distance is, for example, determined using the following formula:

$$D_{ldg} = V_x \cdot T_{td}$$

in which:
 Dldg is the current landing distance;
 Vx is the current speed of the aircraft relative to the ground, considered in projection on a straight line parallel to the central longitudinal axis of the landing runway;
 Ttd is a time interval between a current instant and an instant of landing of the aircraft. This time interval can be computed as indicated previously with reference to the first embodiment.

The processing unit 24 determines a deviation between, on the one hand, the distance between the current position of the aircraft and the landing position and, on the other hand, the current landing distance Dldg. The processing unit 24 compares this deviation with a predetermined threshold. If this deviation is greater than the predetermined threshold, the processing unit 24 commands the signaling of an alert by means of the signaling system 30 of the aircraft. The value of the predetermined threshold can be chosen equal to a distance margin of a few tens or hundreds of meters, for example about 200 meters, in such a way that the processing unit 24 commands the signaling of the alert when the distance between the current position of the aircraft and the landing position is greater than the current landing distance Dldg plus the distance margin.

To determine the distance between the current position of the aircraft and the landing position, the processing unit 24 firstly determines the trajectory between the current position of the aircraft and the landing position. Accordingly, at the current position of the aircraft, the speed vector of the aircraft along the trajectory is considered to be aligned with the current course of the aircraft. The landing position is considered on the central longitudinal axis 4 of the landing runway (without, however, this landing position being frozen longitudinally on this axis), the speed vector of the aircraft then being aligned with the central longitudinal axis. The processing unit 24 determines the trajectory using a known procedure for trajectory generation, while complying with the constraint relating to the roll angle of the aircraft, corresponding, for example, to a maximum value of roll angle of 3 degrees (in absolute value) and to a maximum roll rate of 2 degrees per second (in absolute value) as mentioned previously. Among the known procedures for trajectory generation, it is, for example, possible to use Dubins curves (succession of clothoids, of circular arcs, of straight lines, etc.), splines (for example Bezier curves), etc. These procedures can be implemented analytically (by considering a predetermined string of trajectory elements such as circular arcs, straight lines, etc.) or numerically (by searching for curves that optimize the curvature and the derivative of the curvature). Once the trajectory has been determined by the processing unit 24, the landing position is likewise determined from a longitudinal point of view on the central longitudinal axis 4 of the landing runway. The processing unit 24 then computes the distance between the current position of the aircraft and the landing position, in projection on a straight line parallel to the central longitudinal axis 4 of the landing runway.

Alternatively, the distance between the current position of the aircraft and the landing position can be computed by using a table comprising as inputs values of lateral deviation of the aircraft with respect to the approach axis, values of angular deviation between the current speed vector of the aircraft and the approach axis and values of height of the aircraft, this table providing as output values of distance between the current position of the aircraft and the landing position on the central longitudinal axis of the landing runway. This table can, for example, be utilized as is by the processing unit 24 (optionally with the aid of interpolation techniques), or else be utilized in the form of a neural network.

The third embodiment can be combined with the second embodiment. According to a first alternative, this combination can be carried out by means of a logical OR of the conditions of activation of the alerts corresponding to these two embodiments, thereby allowing greater sensitivity in the detection of cases of alert. According to a second alternative, this combination can be carried out by means of a logical AND of the conditions of activation of the alerts corresponding to these two embodiments, thereby allowing greater immunity to false alerts.

Figure 3:
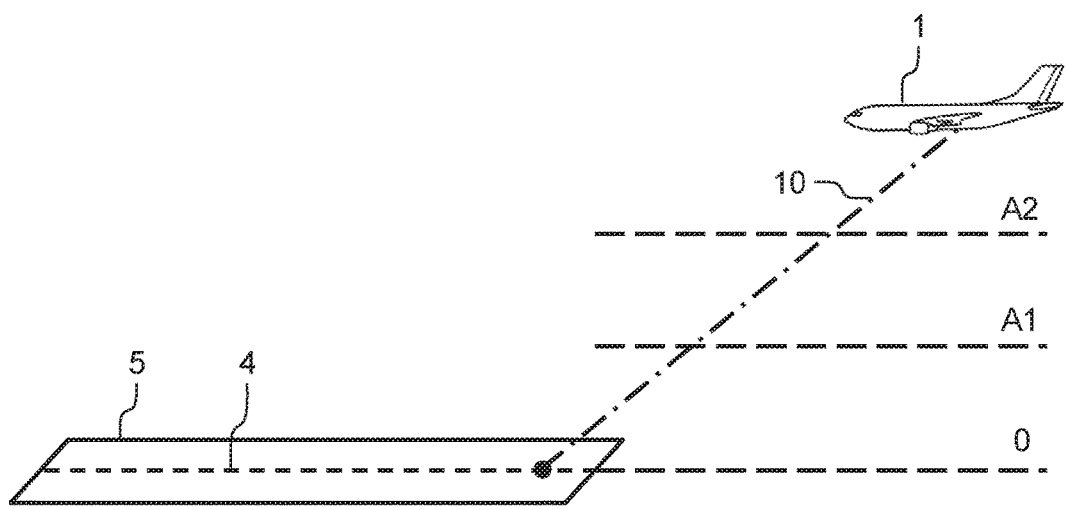
FIG. 3, already described, corresponds to a side view of the approach represented in FIGS. 1 and 2.

In a first particular embodiment, the first embodiment (whichever variant is considered) is implemented when the current height of the aircraft relative to a threshold of the landing runway is greater than a first predetermined height threshold A1, for example 100 feet (about 30 meters), as represented in FIG. 3. The alert, the signaling of which is optionally commanded by the system for aiding landing, then corresponds to an alert of "warning" type making it possible to signal to the pilot of the aircraft that he must correct the current situation of the aircraft in order to avoid exiting the runway laterally. The height of the aircraft relative to the terrain is then considered sufficient for the pilot to be able to attempt a maneuver to correct the trajectory of the aircraft so as to avoid exiting the runway laterally, without taking any risk in respect of the safety of the aircraft. Even if he does not succeed in correcting the trajectory of the aircraft sufficiently, the pilot is thus informed in advance of a risk of exiting the runway laterally, thereby allowing him to prepare himself to effect a go-around in order to attempt a new approach. In an advantageous, although optional, manner, the first embodiment is implemented only from the point in time when the current height of the aircraft relative to the threshold of the landing runway is less than a second predetermined height threshold A2, for example 200 feet (about 60 meters), as represented in FIG. 3. This makes it possible for the alert of warning type to be signaled only when the aircraft is sufficiently close to the landing runway so as to avoid untimely alerts in the cockpit.

In a second particular embodiment, that can optionally be combined with the first particular embodiment, the second embodiment and/or the third embodiment (optionally combined with one another as indicated previously) are implemented when the current height of the aircraft relative to the threshold of the landing runway is less than the first predetermined height threshold A1, for example 100 feet (about 30 meters). The alert, the signaling of which is optionally commanded by the system for aiding landing, then corresponds to an alert of "caution" type making it possible to signal to the pilot of the aircraft that he can no longer correct the trajectory of the aircraft in order to avoid exiting the runway laterally, without taking some other risk, and that he must then carry out a go-around in order to attempt a new approach. Indeed, the height of the aircraft relative to the terrain is then no longer sufficient to carry out a maneuver to correct the trajectory of the aircraft without the risk either of touching the ground with a wing tip if the trajectory correction requires too high a roll angle, or of landing at a landing position that is too close to the end of the runway if the trajectory correction is carried out with a lower roll angle, or else of bringing about a situation in which the pilot would not be able to control the dynamics of the aircraft to stabilize it while landing at the landing position.

In another particular embodiment, the first embodiment can also be implemented when the current height of the aircraft relative to the threshold of the landing runway is less than the first predetermined height threshold A1. In such a case, the different variants can be used alone or combined with one another as indicated above. The second variant exhibits a greater interest than the other two insofar as it takes account of the current roll angle of the aircraft. These different variants can also be combined with the second embodiment and/or with the third embodiment so as to improve the detection of alerts. When the first embodiment is implemented while the current height of the aircraft relative to the threshold of the landing runway is less than the first predetermined height threshold A1, in an advantageous manner the processing unit adapts accordingly the predetermined threshold with which the deviation between, on the one hand, the parameter relating to the landing position of the aircraft on the landing runway and, on the other hand, the reference relating to the central longitudinal axis of the landing runway is compared. More particularly, the processing unit reduces the value of the predetermined threshold when the current height of the aircraft relative to the threshold of the landing runway is less than the first predetermined height threshold A1, so as to take account of the proximity of the ground.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for aiding the landing of an aircraft on a landing runway, the aircraft comprising a set of information sources, a flight management system, a processing unit and a signaling system, the method comprising the following steps implemented in an automatic manner by the processing unit:
- a) acquiring, from the flight management system, information relating to the landing runway;
- b) acquiring, from the set of information sources, information relating to a current situation of the aircraft;
- c) determining, as a function of the information relating to the current situation of the aircraft and of the information relating to the landing runway, at least one deviation between at least one parameter relating to a landing position of the aircraft on the landing runway and a reference relating to a central longitudinal axis of the landing runway;
- d) comparing this deviation with a predetermined threshold; and
- e) as a function of the result of the comparison carried out in step d), commanding, if appropriate, the signaling of an alert by means of the signaling system of the aircraft, wherein:
in step b), the information relating to the current situation of the aircraft comprises a current roll angle of the aircraft;
in step c), said at least one parameter corresponds to the landing position of the aircraft on the landing runway and said at least one deviation corresponds to a deviation between, on the one hand, the landing position of the aircraft on the landing runway and, on the other hand, the central longitudinal axis of the landing runway;
in step d), this deviation is compared with a predetermined distance threshold and the current roll angle is compared with a predetermined roll angle threshold; and
in step e), the processing unit commands the signaling of the alert if the following conditions all hold:
said deviation is greater, in absolute value, than this predetermined distance threshold;
the current roll angle is greater, in absolute value, than the predetermined roll angle threshold; and
the current roll angle tends to deviate the landing position of the aircraft on the landing runway from the central longitudinal axis of the landing runway.

2. The method as claimed in claim 1, wherein:
in step c), said at least one parameter corresponds furthermore to a speed vector of the aircraft at its landing position on the landing runway and said at least one deviation corresponds to an angular deviation between, on the one hand, this speed vector and, on the other hand, a direction of the central longitudinal axis of the landing runway;
in step d), this deviation is compared with a predetermined angular threshold; and
in step e), the processing unit commands the signaling of the alert if this deviation is greater, in absolute value, than this predetermined angular threshold.

3. The method as claimed in claim 1, wherein steps a), b), c), d) and e) are implemented in an automatic and repetitive manner as long as a current height of the aircraft is greater than a predetermined height threshold, the method furthermore comprising the following steps implemented in an automatic manner by the processing unit when the current height of the aircraft is less than this predetermined height threshold:
- a) acquiring, from the flight management system, information relating to the landing runway;
- b) acquiring, from the set of information sources, information relating to a current situation of the aircraft;
- f) determining a maximum roll angle, in absolute value, necessary to allow a flight of the aircraft along a trajectory between a current position of the aircraft and a target landing position of the aircraft on the landing runway;
- g) comparing this maximum roll angle with a predetermined roll angle limit; and
- h) as a function of the result of the comparison carried out in step g), commanding, if appropriate, the signaling of an alert by means of the signaling system of the aircraft.

4. The method as claimed in claim 1, wherein steps a), b), c), d) and e) are implemented in an automatic and repetitive manner as long as a current height of the aircraft is greater than a predetermined height threshold, the method furthermore comprising the following steps implemented in an automatic manner by the processing unit when the current height of the aircraft is less than this predetermined height threshold:
- a) acquiring, from the flight management system, information relating to the landing runway;
- b) acquiring, from the set of information sources, information relating to a current situation of the aircraft;
- i) determining, as a function, on the one hand, of the information relating to the current situation of the aircraft and, on the other hand, of the information relating to the landing runway, a landing position of the aircraft on a central longitudinal axis of the landing runway, this landing position being determined as a function of a trajectory determined between a current position of the aircraft and this landing position so as to comply with at least one constraint relating to a roll angle of the aircraft;
- j) determining a parameter relating to said landing position of the aircraft on the central longitudinal axis of the landing runway;
- k) determining a deviation between this parameter and a reference value;
- l) comparing this deviation with a predetermined threshold; and
- m) as a function of the result of the comparison carried out in step l), commanding, if appropriate, the signaling of an alert by means of the signaling system of the aircraft.

5. A system for aiding the landing of an aircraft on a landing runway, the aircraft comprising a set of information sources, a flight management system and a signaling system, the system for aiding landing comprising a processing unit configured to implement the following steps:
- a) acquiring, from the flight management system, information relating to the landing runway;
- b) acquiring, from the set of information sources, information relating to a current situation of the aircraft;
- c) determining, as a function of the information relating to the current situation of the aircraft and of the information relating to the landing runway, at least one deviation between at least one parameter relating to a landing position of the aircraft on the landing runway and a reference relating to a central longitudinal axis of the landing runway;
- d) comparing this deviation with a predetermined threshold; and
- e) as a function of the result of the comparison carried out in step d), commanding, if appropriate, the signaling of an alert by means of the signaling system of the aircraft, wherein the processing unit is configured in such a way that:

in step b), the information relating to the current situation of the aircraft comprises a current roll angle of the aircraft;

in step c), said at least one parameter corresponds to the landing position of the aircraft on the landing runway and said at least one deviation corresponds to a deviation between, on the one hand, the landing position of the aircraft on the landing runway and, on the other hand, the central longitudinal axis of the landing runway;

in step d), this deviation is compared with a predetermined distance threshold and the current roll angle is compared with a predetermined roll angle threshold; and in step e), the processing unit commands the signaling of the alert if the following conditions all hold:

said deviation is greater, in absolute value, than this predetermined distance threshold;

the current roll angle is greater, in absolute value, than the predetermined roll angle threshold; and the current roll angle tends to deviate the landing position of the aircraft on the landing runway from the central longitudinal axis of the landing runway.

6. The system as claimed in claim 5, wherein the processing unit is configured in such a way that:

in step c), said at least one parameter corresponds furthermore to a speed vector of the aircraft at its landing position on the landing runway and said at least one deviation corresponds to an angular deviation between, on the one hand, this speed vector and, on the other hand, a direction of the central longitudinal axis of the landing runway;

in step d), this deviation is compared with a predetermined angular threshold; and in step e), the processing unit commands the signaling of the alert if this deviation is greater, in absolute value, than this predetermined angular threshold.

7. The system as claimed in claim 5, wherein the processing unit is configured so as to:

implement steps a), b), c), d) and e) in an automatic and repetitive manner as long as a current height of the aircraft is greater than a predetermined height threshold; and implement the following steps in an automatic manner when the current height of the aircraft is less than this predetermined height threshold:

a) acquiring, from the flight management system, information relating to the landing runway;

b) acquiring, from the set of information sources, information relating to a current situation of the aircraft;

f) determining a maximum roll angle, in absolute value, necessary to allow a flight of the aircraft along a trajectory between a current position of the aircraft and a target landing position of the aircraft on the landing runway;

g) comparing this maximum roll angle with a predetermined roll angle limit; and h) as a function of the result of the comparison carried out in step g), commanding, if appropriate, the signaling of an alert by means of the signaling system of the aircraft.

8. The system as claimed in claim 5, wherein the processing unit is configured so as to:

implement steps a), b), c), d) and e) in an automatic and repetitive manner as long as a current height of the aircraft is greater than a predetermined height threshold; and implement the following steps in an automatic manner when the current height of the aircraft is less than this predetermined height threshold:

a) acquiring, from the flight management system, information relating to the landing runway;

b) acquiring, from the set of information sources, information relating to a current situation of the aircraft;

i) determining, as a function, on the one hand, of the information relating to the current situation of the aircraft and, on the other hand, of the information relating to the landing runway, a landing position of the aircraft on a central longitudinal axis of the landing runway, this landing position being determined as a function of a trajectory determined between a current position of the aircraft and this landing position so as to comply with at least one constraint relating to a roll angle of the aircraft;

j) determining a parameter relating to said landing position of the aircraft on the central longitudinal axis of the landing runway;

k) determining a deviation between this parameter and a reference value;

l) comparing this deviation with a predetermined threshold; and m) as a function of the result of the comparison carried out in step l), commanding, if appropriate, the signaling of an alert by means of the signaling system of the aircraft.

9. An aircraft comprising:

a system for aiding the landing of an aircraft on a landing runway, a set of information sources, a flight management system, and a signaling system, the system for aiding landing comprising a processing unit configured to implement the following steps:

a) acquiring, from the flight management system, information relating to the landing runway;

b) acquiring, from the set of information sources, information relating to a current situation of the aircraft;

c) determining, as a function of the information relating to the current situation of the aircraft and of the information relating to the landing runway, at least one deviation between, on the one hand, at least one parameter relating to a landing position of the aircraft on the landing runway and, on the other hand, a reference relating to a central longitudinal axis of the landing runway;

d) comparing this deviation with a predetermined threshold; and e) as a function of the result of the comparison carried out in step d), commanding, if appropriate, the signaling of an alert by means of the signaling system of the aircraft, wherein the processing unit is configured in such a way that:

in step b), the information relating to the current situation of the aircraft comprises a current roll angle of the aircraft;

in step c), said at least one parameter corresponds to the landing position of the aircraft on the landing runway and said at least one deviation corresponds to a deviation between, on the one hand, the landing position of the aircraft on the landing runway and, on the other hand, the central longitudinal axis of the landing runway;

in step d), this deviation is compared with a predetermined distance threshold and the current roll angle is compared with a predetermined roll angle threshold; and in step e), the processing unit commands the signaling of the alert if the following conditions all hold:
said deviation is greater, in absolute value, than this predetermined distance threshold;
the current roll angle is greater, in absolute value, than the predetermined roll angle threshold; and
the current roll angle tends to deviate the landing position of the aircraft on the landing runway from the central longitudinal axis of the landing runway.

10. The aircraft as claimed in claim 9, wherein the processing unit is configured in such a way that:
in step c), said at least one parameter corresponds furthermore to a speed vector of the aircraft at its landing position on the landing runway and said at least one deviation corresponds to an angular deviation between, on the one hand, this speed vector and, on the other hand, a direction of the central longitudinal axis of the landing runway;
in step d), this deviation is compared with a predetermined angular threshold; and
in step e), the processing unit commands the signaling of the alert if this deviation is greater, in absolute value, than this predetermined angular threshold.

11. The system as claimed in claim 9, wherein the processing unit is configured so as to:
implement steps a), b), c), d) and e) in an automatic and repetitive manner as long as a current height of the aircraft is greater than a predetermined height threshold; and
implement the following steps in an automatic manner when the current height of the aircraft is less than this predetermined height threshold:
a) acquiring, from the flight management system, information relating to the landing runway;
b) acquiring, from the set of information sources, information relating to a current situation of the aircraft;
f) determining a maximum roll angle, in absolute value, necessary to allow a flight of the aircraft along a trajectory between a current position of the aircraft and a target landing position of the aircraft on the landing runway;
g) comparing this maximum roll angle with a predetermined roll angle limit; and
h) as a function of the result of the comparison carried out in step g), commanding, if appropriate, the signaling of an alert by means of the signaling system of the aircraft.

12. The system as claimed in claim 9, wherein the processing unit is configured so as to:
implement steps a), b), c), d) and e) in an automatic and repetitive manner as long as a current height of the aircraft is greater than a predetermined height threshold; and
implement the following steps in an automatic manner when the current height of the aircraft is less than this predetermined height threshold:
a) acquiring, from the flight management system, information relating to the landing runway;
b) acquiring, from the set of information sources, information relating to a current situation of the aircraft;
i) determining, as a function, on the one hand, of the information relating to the current situation of the aircraft and, on the other hand, of the information relating to the landing runway, a landing position of the aircraft on a central longitudinal axis of the landing runway, this landing position being determined as a function of a trajectory determined between a current position of the aircraft and this landing position so as to comply with at least one constraint relating to a roll angle of the aircraft;
j) determining a parameter relating to said landing position of the aircraft on the central longitudinal axis of the landing runway;
k) determining a deviation between this parameter and a reference value;
l) comparing this deviation with a predetermined threshold; and
m) as a function of the result of the comparison carried out in step l), commanding, if appropriate, the signaling of an alert by means of the signaling system of the aircraft.

* * * * *